US012614788B2

(12) United States Patent
Lepoivre et al.

(10) Patent No.: US 12,614,788 B2
(45) Date of Patent: Apr. 28, 2026

(54) ELECTROCHEMICAL POUCH CELL FOR ENERGY STORAGE DEVICE

(71) Applicant: RENAULT S.A.S, Boulogne Billancourt (FR)

(72) Inventors: Florent Lepoivre, Guyancourt (FR); Masato Origuchi, Guyancourt (FR)

(73) Assignee: AMPERE S.A.S, Boulogne Billancourt (FR)

( * ) Notice: Subject to any disclaimer, the term of this patent is extended or adjusted under 35 U.S.C. 154(b) by 446 days.

(21) Appl. No.: 18/253,287

(22) PCT Filed: Nov. 16, 2021

(86) PCT No.: PCT/EP2021/081879
§ 371 (c)(1),
(2) Date: May 17, 2023

(87) PCT Pub. No.: WO2022/106426
PCT Pub. Date: May 27, 2022

(65) Prior Publication Data
US 2024/0006688 A1 Jan. 4, 2024

(30) Foreign Application Priority Data
Nov. 20, 2020 (FR) ...................................... 2011947

(51) Int. Cl.
*H01M 50/105* (2021.01)
*B60L 50/64* (2019.01)
(Continued)

(52) U.S. Cl.
CPC ........... *H01M 50/105* (2021.01); *B60L 50/64* (2019.02); *H01M 10/613* (2015.04);
(Continued)

(58) Field of Classification Search
CPC . H01M 50/105; H01M 50/471; H01M 50/474
See application file for complete search history.

(56) References Cited

U.S. PATENT DOCUMENTS

2013/0189561 A1* 7/2013 Kim .................... H01M 50/474
429/186

FOREIGN PATENT DOCUMENTS

KR          1020110053836 A * 5/2011 ......... H01M 50/126
WO       WO 2019/184060 A1 10/2019

OTHER PUBLICATIONS

International Search Report issued on Feb. 23, 2022 in PCT/EP2021/081879, filed on Nov. 16, 2021, 2 pages.
(Continued)

*Primary Examiner* — Kevin E Yoon
(74) *Attorney, Agent, or Firm* — Oblon, McClelland, Maier & Neustadt, L.L.P.

(57) ABSTRACT

An electrochemical pouch cell is for an electrical energy storage device, in particular intended for a motor vehicle. The electrochemical cell includes a stack of a plurality of electrodes, at least one electric terminal and a liner connected to the electric terminal and to itself, respectively at a primary connection and a secondary connection, so as to form a recess into which the plurality of electrodes and all or part of the at least one electric terminal extend, the electric terminal having a first dimension substantially equal to or greater than a first dimension of a stack of the plurality of electrodes.

16 Claims, 10 Drawing Sheets

(51) Int. Cl.

| | |
|---|---|
| *H01M 10/613* | (2014.01) |
| *H01M 10/625* | (2014.01) |
| *H01M 10/647* | (2014.01) |
| *H01M 50/178* | (2021.01) |
| *H01M 50/471* | (2021.01) |
| *H01M 50/474* | (2021.01) |
| *H01M 50/477* | (2021.01) |
| *H01M 50/548* | (2021.01) |
| *H01M 50/557* | (2021.01) |
| *H01M 50/566* | (2021.01) |
| *H01M 50/569* | (2021.01) |

(52) U.S. Cl.
CPC ....... *H01M 10/625* (2015.04); *H01M 10/647* (2015.04); *H01M 50/178* (2021.01); *H01M 50/474* (2021.01); *H01M 50/477* (2021.01); *H01M 50/548* (2021.01); *H01M 50/557* (2021.01); *H01M 50/566* (2021.01); *H01M 50/569* (2021.01); *H01M 2220/20* (2013.01)

(56) References Cited

OTHER PUBLICATIONS

French Preliminary Search Report issued on Sep. 13, 2021 in French Application No. 20 11947 filed on Nov. 20, 2020 (with English Translation of Categories of Cited Documents), 3 pages.

* cited by examiner

Prior Art

ELECTROCHEMICAL POUCH CELL FOR ENERGY STORAGE DEVICE

The present invention relates to an electrochemical pouch cell for an electrical energy storage device, notably an electrical battery. The invention relates also to an electrical energy storage device comprising said cell and a vehicle equipped with such a storage device and/or such a cell. The invention relates finally to a method for manufacturing an electrochemical pouch cell.

In electric or hybrid vehicles, the current electrical motor drive means involve electrical storage devices, or electrical batteries, that are increasingly powerful in order to rival the performance levels of heat engines. Increasing the electric drive performance levels relies greatly on improving the range of the vehicle, for example by increasing the volume of the storage devices.

Conventionally, the storage devices, also called "battery pack", or more simply "battery", comprise a plurality of cells, notably of lithium, or Li-ion type, which can be produced according to different architectures. The so-called cylindrical and prismatic cells consist of a winding or a stack of electrodes slipped into a metal housing previously manufactured and sealed with a cover.

The so-called bag or pouch cells 1', of which a prior art example is illustrated in FIG. 11, comprise electrodes that are stacked and welded together via electrical terminals 4' then jacketed in a liner 3', also called bag or "pouch", which is heat-sealed so as to allow only the electrical terminals 4' to emerge therefrom. The seal of the heat-sealing is a critical point of this technology; it requires a smooth surface, that is to say without folds, of the liner 3' which is usually obtained by "predeformation", notably by stamping, so as to form a cavity in which the electrodes are disposed. The predeformation of the liner is accompanied by a not-inconsiderable stretching of material, so its depth is limited by the risks of tearing.

Because of this, while the dimensions of the cells of cylindrical and prismatic type can easily be increased to accommodate more energy, that is to say greater capacity and/or power, the pouch technology is conditioned on the one hand by the predeformation step, limited to a depth of the order of 14-15 mm currently, and on the other hand by the dimensions of the terminal or of the electrical terminals 4' which cannot exceed certain dimensions, at risk of impacting the seal of the weld of the liner 3' on the electrical terminal 4' at its ends, as represented in FIG. 11. The electrical terminals 4' of such electrochemical pouch cells 1' therefore have a relatively small section, and are incompatible with the use of high-power charge or discharge current.

Moreover, increasing the electric drive performance levels relies also on the search for fast charging means. "Fast charge" terminals are known that implement significant electrical powers, notably greater than 50 kW, or ultra-fast charge terminals involving electrical powers ranging up to 200 kW.

Such powers are nevertheless accompanied by dissipation of heat in the battery of the vehicle, which, if not removed, can provoke irreversible damage thereto such as a reduction of its service life or a limitation of its rate of charge. Such damage is notably observed in the materials conveying the current, such as the electrical terminals (notably the electrical connectors) and the welds.

The cooling of the electrochemical cells is done conventionally on the narrowest face of the cell, also called useful cooling surface, which is limited when the cell is produced according to the pouch technology in order to preserve the seal of the cell, thereby preventing the effective cooling thereof and thereby even impacting its durability.

For its part, the document EP3327854 discloses a battery cell of which an electrical terminal is composed of an electrical connector incorporated in an insulating material whose section is close to that of the stack of electrodes. To this end, the document proposes coating a part of the connector with a layer that makes it possible to absorb gases, which is complex and costly.

The invention falls within this context and its aim is to provide an electrochemical pouch cell for an electrical storage device, notably intended for a motor vehicle, with reduced cost allowing an unlimited increase in the dimensions of the cell and its electrical terminal or terminals, in order to enhance its performance levels. The invention aims also to propose a method for manufacturing such a cell that is simpler to produce and less costly. To this end, the invention proposes an electrochemical pouch cell for an electrical energy storage device, notably an electric battery, the electrochemical cell comprising a stack of a plurality of electrodes, notably at least one anode and one cathode, and a liner. The electrochemical cell is particularly characterized in that it comprises:

at least one electrical terminal comprising a base produced in an insulating material and an electrical connector extending on a first axis, the base of the electrical terminal having a first dimension on a second axis that is substantially equal to or greater than a first dimension on the second axis of the stack of the plurality of electrodes, said second axis being orthogonal to said first axis, the at least one electrical terminal and the liner contributing to delimiting a housing in which the plurality of electrodes extends;

at least one primary link of an end portion of the liner to a perimeter of the base of the at least one electrical terminal;

a secondary link of an end lateral portion of the liner to an opposite end lateral portion of the liner, that are distinct from the end portion.

Optionally, the base of the at least one electrical terminal can have a second dimension on a third axis substantially equal to or greater than a second dimension on the third axis of the stack of the plurality of electrodes, said third axis being orthogonal to the first axis and to the second axis.

Also, according to an optional but preferential feature, the at least one primary link can be produced by thermowelding or by bonding and/or the secondary link can be produced by thermowelding or by bonding.

The electrical connector of the at least one terminal can extend through the base, the electrical connector being able to comprise an outer portion that is flat or substantially flat and/or extend parallel or substantially parallel to an outer face of the base.

The electrochemical cell can comprise at least one spacing member disposed in a housing and interposed between the plurality of electrodes on the one hand and the at least one electrical terminal on the other hand, the spacing member comprising at least one void configured to receive at least one tongue of at least one electrode.

Notably, the spacing member can have a cellular structure, notably a honeycomb structure, the cellular structure comprising cells, in a vacuum, intended to accommodate a gas produced during the operation of the electrochemical cell.

Optionally, the base of the at least one electrical terminal can comprise:

a fixing member configured to ensure the anchoring of the electrochemical cell on a support element; and/or a sensor, notably a temperature and/or pressure sensor; and/or an overcharge safety device.

The invention relates also to an electrical energy storage device, notably intended for a motor vehicle, comprising at least one electrochemical cell as previously explained.

Notably, such a storage device can further comprise a cooling means arranged along a lateral side of the at least one electrochemical cell.

The invention relates also to a hybrid or electric motor vehicle comprising at least one electrochemical cell according to the invention and/or at least one electrical energy storage device according to the invention.

The present invention relates finally to a method for manufacturing an electrochemical cell as explained previously, comprising:

a step of stacking a plurality of electrodes;

a step of connecting at least one electrical terminal to the plurality of electrodes;

a step of jacketing the set of the plurality of electrodes and at least a part of the base of the at least one electrical terminal in a non-predeformed liner;

a step of linking the liner to the base of the at least one electrical terminal at a primary link;

a step of linking the liner to itself at a secondary link.

Optionally, the jacketing step can comprise a substep of aligning of at least one of the end portions of the liner with the perimeter of the base of the at least one electrical terminal.

Other details, features and advantages will emerge more clearly on reading the detailed description given hereinbelow, in an indictive and nonlimiting manner, in relation to the different exemplary embodiments illustrated in the following figures:

FIG. 1 represents an embodiment of an electrochemical pouch cell 1 according to an embodiment of the invention for an electrical energy storage device 10 as illustrated in FIG. 7.

The energy storage device 10, that can also be called "battery" or "electric battery", comprises a plurality of electrochemical pouch cells 1, notably a plurality of electrochemical cells 1 according to an embodiment of the invention. Such a storage device 10 can be intended, as a nonlimiting example, for a motor vehicle, notably a hybrid or electric drive vehicle.

Figure 1:
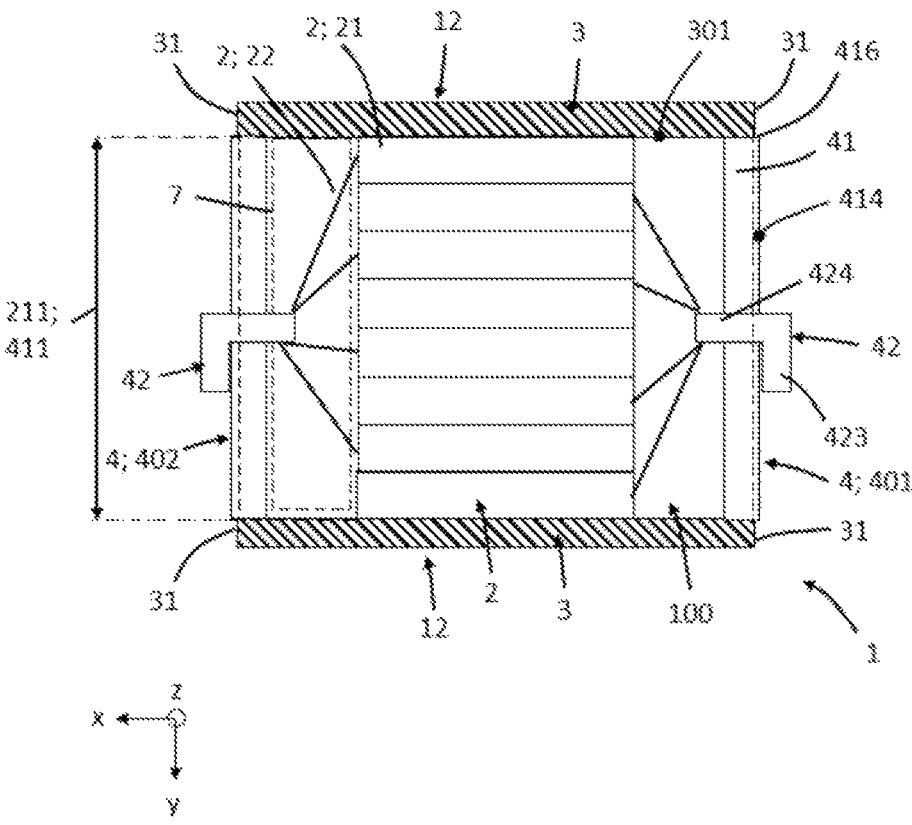
FIG. 1 is a schematic representation in cross-section and top view of an embodiment of an electrochemical pouch cell according to the invention.
Figure 2:
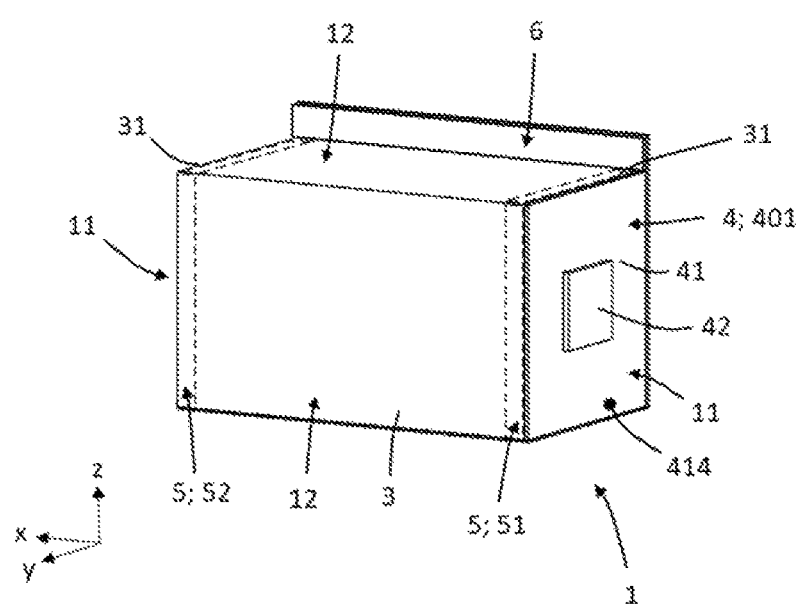
FIG. 2 is a perspective schematic representation of the electrochemical cell.
Figure 3:
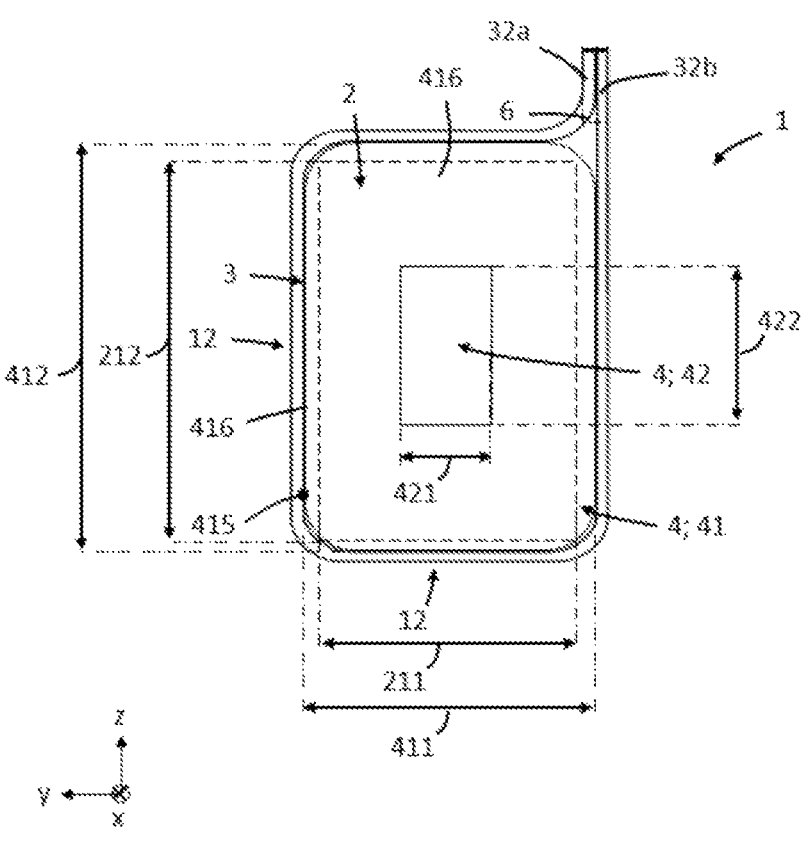
FIG. 3 is a front representation of the electrochemical cell.

The electrochemical cell 1 can store energy in chemical form and restore it in the form of an electrical current. The electrochemical cells can, for example, be of the "lithium-ion" type, also called "Li-ion". Generally, the electrochemical pouch cell 1 as illustrated in FIGS. 1 to 3 comprises a plurality of stacked electrodes 2, notably at least one anode and one cathode spaced apart by an electrically insulating separation element, not represented, and a liner 3. Also, the electrochemical cell 1 comprises at least one electrical terminal 4.

Throughout the description hereinbelow, the orientation of the electrochemical cell will be defined according to a first axis X, a second axis Y, orthogonal to the first axis X, and a third axis Z, orthogonal to the first axis X and to the second axis Y. The axes X, Y and Z are notably represented by a trihedron XYZ in the figures that require it.

Also, throughout the figures, the dimensions and spacings separating the different components may be exaggerated for the purposes of clarity.

A "pouch" is understood to be a bag or pouch structure of the liner 3. The liner 3 can, for example, be of composite and/or laminated type, that is to say it can comprise a plurality of layers or sheets secured together produced in different materials. Notably, the liner 3 can comprise a metal sheet, for example produced in aluminum or in an aluminum-based alloy, and/or a plastic sheet, produced for example, in a nonlimiting manner, in PET (polyethylene terephthalate), nylon, PP (polypropylene), PPa (acidified polypropylene).

The at least one electrical terminal 4 and the liner 3 contribute to delimiting a housing 100 in which the plurality of electrodes 2 extends. The at least one electrical terminal 4 is disposed at an end portion 31, notably along the first axis X, of the liner 3, whereas the plurality of electrodes 2 is arranged between the opposite end portions 31 of the liner 3, notably centrally, or substantially centrally.

The electrochemical cell 1 can have a parallelepipedal or substantially parallelepipedal form, notably rectangular or square parallelepipedal, even cubic. For the purposes of clarity, the electrochemical cell 1 represented has, in a nonlimiting manner, a rectangular parallelepipedal form.

The cell 1 comprises two end sides 11, delimiting the electrochemical cell along the first axis X, and a plurality of lateral sides 12, linking the end sides 11 together. In this particular case, one of the end sides 11 is formed by the electrical terminal 4, and the electrochemical cell 1 comprises four lateral sides 12, formed by the liner 3.

Also, the liner 3 has a form suited to the formation by folding of a pouch or of a bag that is substantially parallelepipedal, notable rectangular or square parallelepipedal, even cubic.

The plurality of electrodes 2 extends in the housing 100 according to a stack, that is to say that the different electrodes 2 are disposed facing one another along at least one axis, for example the second axis Y or the third axis Z. The stack of the plurality of electrodes is particularly arranged so as to present an alteration of an anode and of a cathode.

In particular, as previously explained, the electrochemical cell 1 can comprise at least one electrically insulating separation element, not represented, interposed between each adjacent anode and cathode of the plurality of electrodes 2.

Each electrode comprises a main portion 21, flat or substantially flat, and at least one tongue 22 extending in the housing 100 in such a way as to protrude from the main portion 21. Notably, the at least one tongue 22 extends toward the at least one electrical terminal 4 and is configured to cooperate therewith.

In the electrochemical cell 1, the housing 100 contains, or is partially filled with, a non-aqueous electrolyte soaking the plurality of electrodes 2, notably pores of the plurality of electrodes, and the separation element or elements. The electrolyte can, by way of example, consist of lithium salts (LiPF6, LiBF4, LiClO4, LiTFSI, LiFSI, LiBOB) dissolved in an organic solvent such as dimethyl, ethylene or diethyl carbonate, propylene carbonate or acetonitrile.

The electrical terminal 4 comprises a base 41 which can be produced in an insulating material, such as plastic or ceramic, and a metal electrical connector 42. Notably, the base 41 can be produced in an electrically insulating material. Optionally, but preferentially, the base 41 can, furthermore, be produced in a thermally conductive material.

The electrical connector 42 allows the connection of the plurality of electrodes 2 with an electrical circuit, not represented, of the cell 1 by cooperation with the at least one tongue 22 specific to each electrode. The electrical connector 42 extends at least partly on the first axis X, that is to say that the first axis X defines a direction of extension of at least a part of the electrical connector 42. In yet other words, the axis X can be defined by the axis according to which the electrical connector 42 extends toward the outside of the electrochemical cell 1.

According to a feature of the invention, the base 41 of the at least one electrical terminal 4 has a first dimension 411 on the second axis Y or on the third axis Z that is substantially equal to or greater than a first dimension 211 of the stack of the plurality of electrodes 2 on this same second axis Y or this same third axis Z, respectively.

In an embodiment that is illustrated and described hereinbelow, the first dimension is defined by the second axis Y and extends orthogonally to the first axis X on which the electrical connector 42 at least partly extends. It is understood that the present invention extends also to an alternative embodiment, not represented, in which the first dimension 411 is defined by the third axis Z, all of the present description applying mutatis mutandis to such an alternative embodiment.

Notably, the first dimension can correspond to a width, as illustrated, or, alternatively, to a height. "Substantially equal" is understood to mean a first dimension 411 of the base 41 of the at least one electrical terminal 4 having a value of the order of the first dimension 211 of the stack of electrodes ±7%, notably ±3%.

Optionally but preferentially, the base 41 of the at least one electrical terminal 4 has a second dimension 412 that is substantially equal to or greater than a second dimension 212 of the stack of the plurality of electrodes 2. "Second dimensions" of the at least one electrical terminal 4 and of the stack is understood to mean here a dimension on the third axis Z, that is to say a dimension orthogonal to the first axis X and the second axis Y and to the first dimensions 411,211. It is understood that the present invention extends also to the alternative embodiment, not represented, in which the second dimension 412 is defined by the second axis Z, all of the present description applying mutatis mutandis to such an alternative embodiment.

As previously explained, "substantially equal" is then understood to mean the second dimension 412 of the base 41 of the at least one electrical terminal 4 having a value of the order of the second dimension 212 of the stack of electrodes ±7%, notably ±3%.

Moreover, the electrical connector 42 can, optionally, have a first dimension 421 on the second axis Y lying between 20 and 100% of the first dimension 211 of the stack of the plurality of electrodes 2 on the second axis Y.

Alternatively or in combination, the electrical connector 42 can have a second dimension 422 on the third axis Z lying between 30 and 90% of the second dimension 412 of the base 41, on this same third axis Z.

Thus, the electrochemical cell 1 according to the invention allows an increase in the dimensions of the electrical terminal 4 and, more specifically, of the electrical connector 42, relative to the connectors conventionally observed in pouch-type cells. Such an increase in the section of the electrical connector 42 renders the electrochemical cell 1 compatible with an increase in the rate of charge of the storage device 10 by virtue of a high electrical current while preventing the overheating of the electrical connector 42.

The electrical connector 42 of the at least one electrical terminal 4 extends in the base 41 at least from the housing 100 to the environment outside the electrochemical cell 1. The electrical connector 42 extends in such a way as to protrude from the base 41, both in the housing 100, that is to say in the direction of the plurality of electrodes 2, and in the outside environment, notably in order to allow the connection between a plurality of electrochemical cells 1.

The electrical connector 42 comprises at least one inner portion 424, extending in the housing 100 and through the base 41 on the first axis X, and an outer portion 423. In particular, the outer portion 423 can be flat or substantially flat and/or extend parallel or substantially parallel to an outer face 414 of the base 41. The aim of such a form of the electrical connector 42 is notably to optimize, as explained further hereinbelow, the assembly of a plurality of electrochemical cells 1 with one another in one and the same electrical energy storage device 10. In other words, the electrical connector 42 can have a substantially "L" shaped structure.

In order to delimit the housing 100 hermetically, the electrochemical cell 1 comprises a plurality of tight links of the liner 3.

The cell comprises at least one primary link 5 with at least one of the end portions 31 of the liner 3 on a perimeter 415 of the base 41 of the at least one electrical terminal 4. In other words, the primary link 5 consists of a link of the liner 3, notably of an inner face 301 of the liner 3 turned towards the housing 100, with a set of lateral edges 416 forming the perimeter 415 of the base 41.

The primary link 5 thus has a closed continuous form, notably annular or square or rectangular. Notably, at least a part of a border of the primary link 5 can be inscribed in a plane orthogonal to the first axis X. In particular, the primary link 5 consists of the link of the liner 3 over all or part of a thickness, on the first axis X, of the base 41.

The electrochemical cell 1 further comprises a secondary link 6 of an end lateral portion 32a of the liner 3 to an opposite end lateral portion 32b of the liner 3, notably visible in FIG. 2. In this particular case, the end lateral portions 32a, 32b consist of the opposite portions linking together the end portions 31 at which at least one electrical terminal 4 can be linked. In particular, the secondary link 6 is produced between parts of the inner face 301 of the liner 3 respectively included in the opposite end lateral portions 32a, 32b.

Notably, the secondary link 6 can extend parallel, or substantially parallel, to the first axis X. Furthermore, preferentially, the secondary link 6 is rectilinear or substantially rectilinear.

It is understood that the terms "primary", "secondary", "first", "second" are here intended to distinguish the different components of the invention and not to establish a hierarchy among them.

In particular, the at least one primary link 5 and the secondary link 6 are characterized by a smallest dimension strictly greater than 2 mm. According to the exemplary embodiment illustrated in FIGS. 1 to 10, a "smallest dimension" of the at least one primary link 5 is understood, in a nonlimiting manner, to be a dimension, not referenced, on the first axis X. Also, "the smallest dimension" of the secondary link 6 is understood to be a dimension on the third axis Z.

The at least one primary link 5 can be produced by thermowelding or bonding and/or the secondary link 6 can be produced by thermowelding or bonding. Advantageously, all or part of the surface of the perimeter 415 of the base 41 of the at least one electrical terminal 4 can be treated so as to ensure a thermo-weld or a defect-free durable bond, compatible with the manufacturing process as explained hereinbelow.

According to an embodiment that is optional but preferential illustrated in FIGS. 2 and 3, the electrochemical cell 1 can comprise two electrical terminals 4, notably a first electrical terminal 401 and a second electrical terminal 402. It is understood that all of the features of the preceding description relating to "the at least one terminal" can thus be extended to the "first electrical terminal 401" and/or to the "second electrical terminal 402". Furthermore, when the electrochemical cell 1 comprises a plurality of electrical terminals 4, the latter can be identical or, alternatively, have distinct characteristics.

Optionally but preferentially, the first electrical terminal 401 and the second electrical terminal 402 have at least one dimension that is equal or substantially equal, notably their first dimension 411 on the second axis Y or their second dimension 412 on the third axis Z. Optionally, the first electrical terminal 401 and the second electrical terminal 402 can have first dimensions 411 that are equal or substantially equal to one another and second dimensions 412 that are equal or substantially equal to one another. In particular, the first electrical terminal 401 and the second electrical terminal 402 are each disposed at an opposite end portion 31 of the liner 3. The electrochemical cell 1 thereby comprises a plurality of primary links 5, specifically a first primary link 51 produced between one of the end portions 31 of the liner 3 and the perimeter 415 of the base 41 of the first electrical terminal 401, and a second primary link 52 produced between the other of the end portions 31 and the perimeter 415 of a base 41 of the second electrical terminal 402.

In such an embodiment, the plurality of electrodes 2 is interposed between the first electrical terminal 401 and the second electrical terminal 402 along at least one axis, notably on the first axis X.

The first electrical terminal 401 and the second electrical terminal 402 are, by way of example, each linked to a subset of electrodes 2 of the plurality of electrodes.

Thus, a first subset of at least one electrode, for example of the cathode type, is configured to be connected to the first electrical terminal 401 and is disposed in such a way that its tongue or tongues 22 extends or extend toward it.

Conversely, a second subset of at least one electrode, for example of the anode type, is configured to be connected to the second electrical terminal 402 and is disposed in such a way that its tongue or tongues 22 extends or extend toward it.

In this particular case, the first electrical terminal 401 is connected to four electrodes 2, for example cathodes, and the second electrical terminal 402 is connected to four distinct electrodes 2, for example anodes. It is understood that such a configuration is in no way limiting, the number and the type of electrodes being able to be varied.

The secondary link 6 produced between the opposite end lateral portions can then be produced so as to extend continuously from the first primary link 51 to the second primary link 52.

Figure 4:
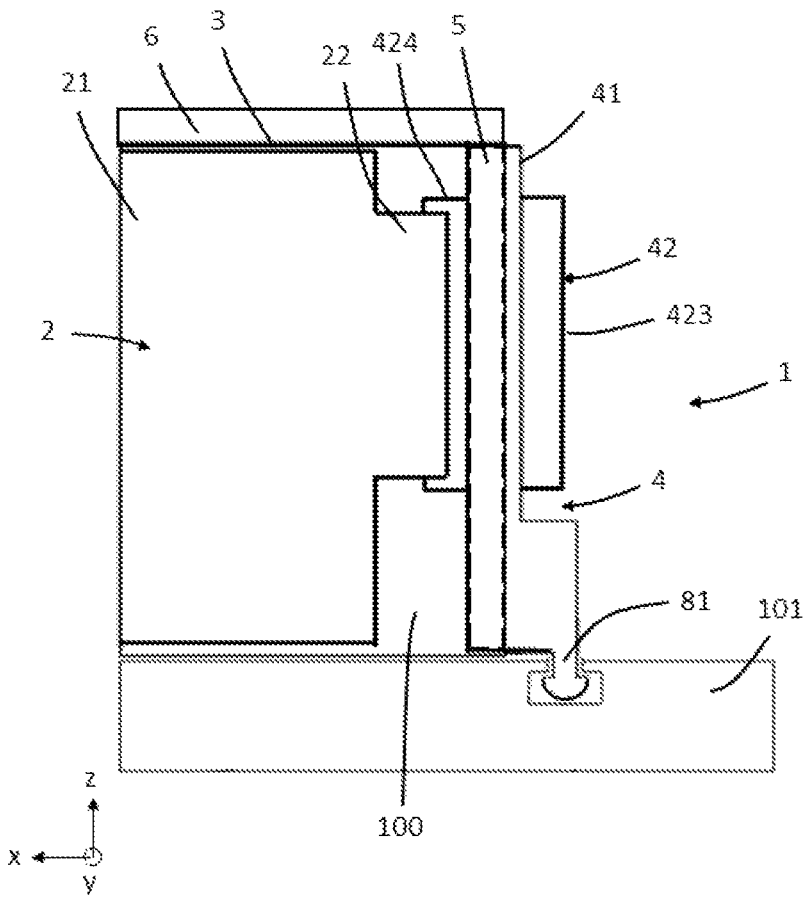
FIG. 4 is a schematic representation of a cross-section of a variant of the electrochemical cell.
Figure 5:
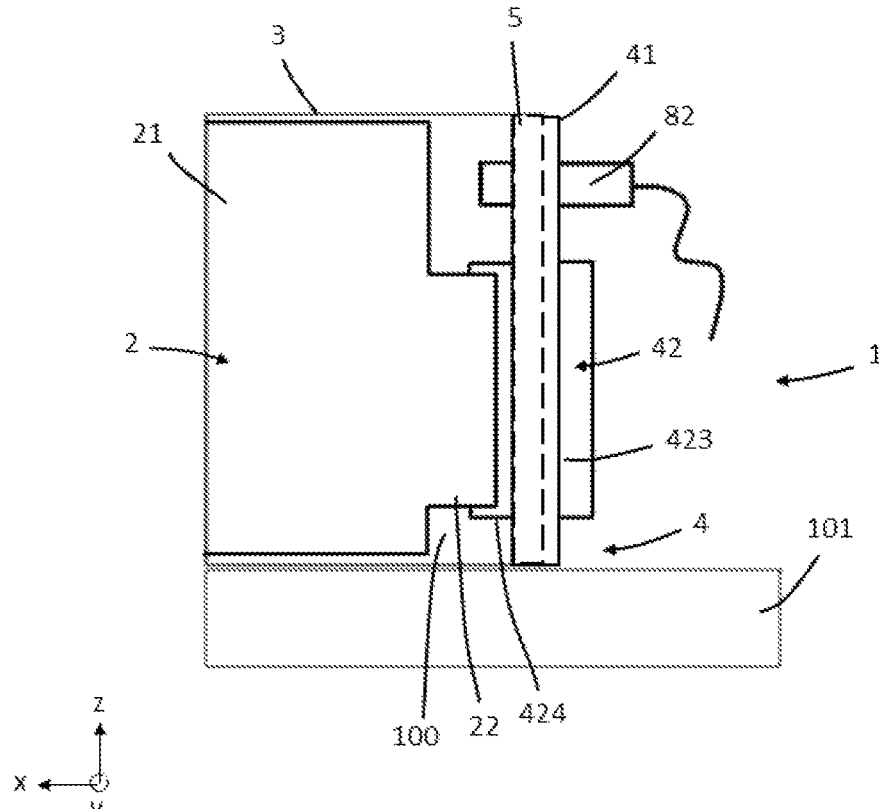
FIG. 5 is a schematic representation of a cross-section of a variant of the electrochemical cell.
Figure 6:
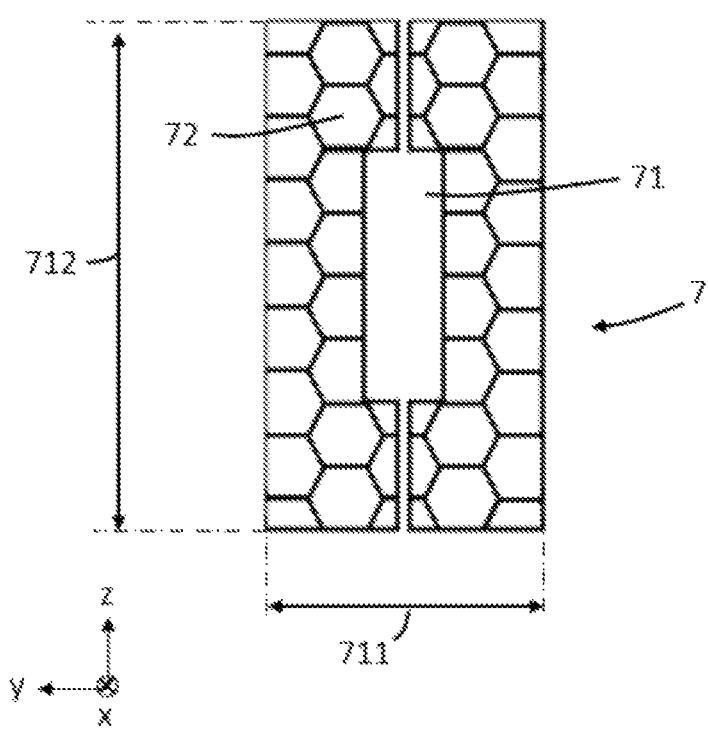
FIG. 6 is a schematic front view representation of a spacing member for an electrochemical cell.

FIGS. 4 and 5 illustrate different optional variants of the electrochemical cell 1 according to the invention. They represent a half-cell in which the at least one electrical terminal 4 comprises different examples of accessories that can be incorporated separately or in combination with one another. FIG. 6, for its part, illustrates an example of a spacing member 7 intended to be disposed in the housing 100.

As illustrated in FIG. 4, the base 41 of the at least one electrical terminal 4, for example of the first electrical terminal 401 and/or of the second electrical terminal 402, can comprise a fixing member 81 configured to ensure the anchoring of the electrochemical cell 1 onto a support element 101. A "support element 101" is understood to be any element capable of bearing, covering or framing the electrochemical cell 1 such as a bodywork element, a plate or a casing, notably a bottom or a cover of such a casing. Advantageously, the electrochemical cell 1 can comprise a plurality of fixing members 81, the latter being able to be included in one and the same electrical terminal 4 and/or in distinct electrical terminals 4.

The fixing member 81 emerges from the outer face 414 of the base 41 and extends in such a way as to protrude therefrom into the environment outside the cell. The fixing member 81 can be arranged at any point of the outer face 414 surrounding the electrical connector 42. Preferentially, the fixing member 81 is produced in a single piece with the base 41.

Notably, the fixing member 81 can be a primary fixing member, configured to cooperate with a secondary fixing member, of complementary form, included in the support element 101.

Alternatively or additionally, the base 41 of the at least one electrical terminal 4, for example of the first electrical terminal 401 and/or of the second electrical terminal 402, can comprise a sensor 82, notably a temperature and/or pressure sensor as illustrated in FIG. 5. Furthermore, the base 41 of the at least one electrical terminal 4, for example of the first electrical terminal 401 and/or of the second electrical terminal 402, can comprise for example an overcharge safety device (not shown), referred to by the acronym OCSD.

The electrochemical cell 1 can also comprise, optionally but preferentially, at least one spacing member 7. The spacing member 7 is configured to be disposed in the housing 100. It is particularly configured so as to be interposed between the electrical terminal 4 and the plurality of stacked electrodes 2, notably on the first axis X.

Advantageously, the spacing member 7 is configured to be disposed at the connection interface between the plurality of electrodes 2 and the at least one electrical terminal 4, that is to say at the link between at least one subset of tongues 22 of the plurality of electrodes 2 and the electrical connector 42 of the at least one electrical terminal 4.

To this end, the spacing member 7 comprises at least one void 71 configured to receive at least one tongue 22 of at least one electrode 2. Furthermore, the void 71 can be configured to receive at least the inner portion 424 of the electrical connector 42 of the at least one electrical terminal 4. As a nonlimiting example, such a void 71 can be arranged centrally in the spacing member 7.

Optionally but preferably, the spacing member 7 has a parallelepipedal or substantially parallelepipedal structure. Furthermore, according to an exemplary embodiment, the spacing member 7 has dimensions that can be likened to those previously explained for the at least one electrical terminal 4 relative to the stack of the plurality of electrodes 2.

Notably, the spacing member 7 can have a first dimension 711 on the second axis Y, substantially equal to or greater than the first dimension 211 of the stack of the plurality of electrodes 2. The expression "substantially equal" is then understood to mean a first dimension 711 of the spacing member 7 that has a value of the order of the first dimension of the stack of electrodes 2 ±7%, notably ±3%.

Similarly, the spacing member 7 can have a second dimension 712 on the third axis Z, substantially equal to or greater than the second dimension 212 of the stack of the plurality of electrodes 2. A second dimension of the spacing member 7 having a value of the order of the second dimension of the stack of electrodes 2 ±7%, notably ±3%, is then qualified as "substantially equal".

According to a particular embodiment, the spacing member 7 has a first dimension 711 that is equal or substantially equal to the first dimension 411 of the base 41 of the at least one electrical terminal 4 and/or the spacing member 7 has a second dimension 712 that is equal or substantially equal to the second dimension 412 of the base 41 of the at least one electrical terminal 4.

Such an arrangement aims, notably, to reinforce the mechanical strength of the electrochemical cell 1. The spacing member 7 contributes to protecting the connecting interface between the plurality of electrodes 2 and the at least one electrical terminal 4, notably in the implementation of the method for manufacturing the electrochemical cell 1 as explained hereinbelow.

The spacing member 7 can, as illustrated, comprise two attachment complementary parts, configured to cooperate with one another and to be disposed in such a way as to bracket at least one tongue 22 of the plurality of electrodes 2. According to an option that is not represented, such parts can comprise complementary fixing elements, for example a snap-fitting system, so as to keep them fixed relative to one another once assembled. Advantageously, the spacing member 7 can have a cellular structure, notably a honeycomb structure. A "cellular structure" is understood to be a structure that has a plurality of cavities 72. "Honeycomb" is understood to mean a plurality of cells 72 of polygonal form, notably hexagonal. Notably, such cells 72 can contain a vacuum and be intended to accommodate a gas produced during the operation of the electrochemical cell 1. Such a feature confers on the spacing member 7 a hollow structure forming a reservoir capable of receiving gases likely to be generated during the operation of the electrochemical cell 1, thus reducing the risks of venting that are conventionally observed.

Figure 7:
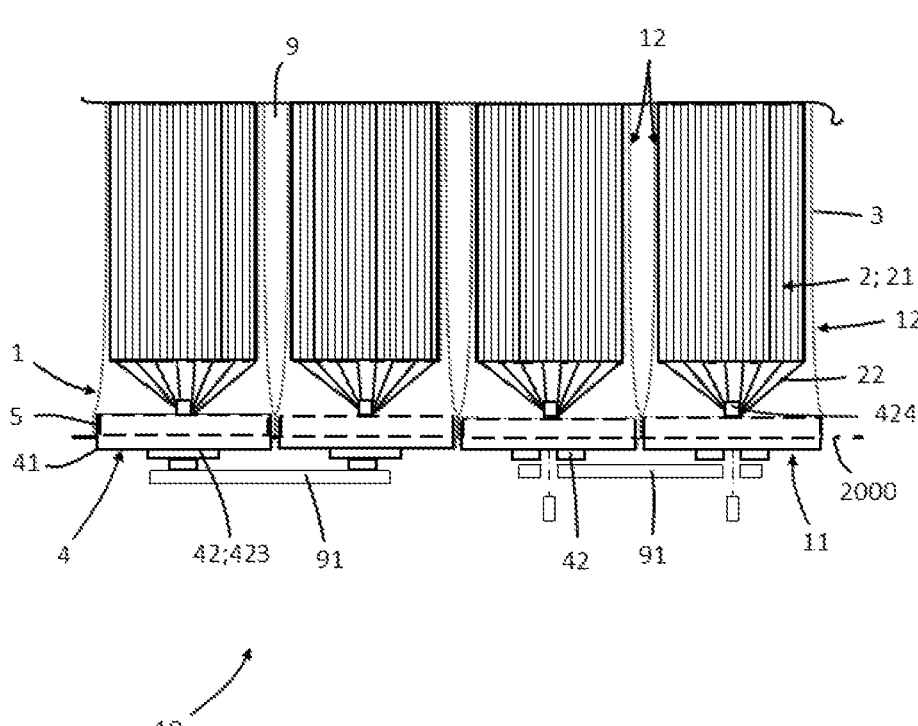
FIG. 7 is a schematic representation of a top view cross-section of an electrical energy storage device.

FIG. 7 illustrates an embodiment of the storage device 10 according to the invention, notably intended for a motor vehicle, comprising at least one electrochemical cell 1 as previously explained.

In the example illustrated, the storage device 10 comprises, by way of example, four electrochemical cells 1 according to the invention that are substantially identical. It is nevertheless understood that such electrochemical cells could have distinct characteristics.

Furthermore, FIG. 7 illustrates a half of the storage device 10 so as to detail an electrical terminal 4 specific to each electrochemical cell 1. It is nevertheless understood that each cell can comprise, as explained previously, a plurality of electrical terminals 4, notably a first electrical terminal 401 and a second electrical terminal 402, each of these electrical terminals being able to be identical or have distinct characteristics, whether within one and the same electrochemical cell 1 or from one electrochemical cell to another within the storage device 10.

All or part of the plurality of electrochemical cells 1 is stacked along at least one direction. A "stacked" disposition is for example understood to be a positioning of the different cells 1 one on top of the other along a vertical direction with respect to a ground on which the vehicle rests, or, alternatively, a positioning of the different cells 1 alongside one another along a direction orthogonal to such a vertical direction.

The electrochemical cells are notably disposed in such a way that their lateral sides 12 extend facing one another, particularly in proximity to one another.

Preferentially, adjacent electrical terminals 4 included in distinct electrochemical cells 1, adjacent to one another, are disposed in contact with one another, notably on at least a part of the lateral edges 416 of their respective bases 41. Furthermore, such electrical terminals 4 can be disposed so as to extend along a common plane 2000.

Such storage devices 10 are conventionally subjected to significant powers, which are accompanied by strong dissipation of heat within the electrochemical cells 1, which, if not removed, is likely to cause irreversible damage. So, in order to ensure its cooling, the storage device 10 can be produced according to different alternatives.

Notably, according to an alternative that is not represented, the storage device 10 can further comprise a cooling means 9, such as a plate configured to allow the circulation of a coolant arranged along at least one lateral side 12 of the cell 1. Such a cooling means 9 is thus interposed between adjacent electrochemical cells 1 along at least one direction.

Furthermore, the end positioning of the at least one electrical terminal 4, notably of the first electrical terminal 401 and of the second electrical terminal 402, contributes to a better control of the geometry of the cell, notably parallelepipedal or substantially parallelepipedal. The result thereof is a better surface of contact of the electrochemical cell 1 with any conventional cooling means 9, thus reducing the manufacturing costs of the cell 1 or of the storage device 10 by virtue of the reduction of need for thermal resins that are conventionally used to fill irregularities between adjacent electrochemical cells.

Alternatively, as illustrated in FIG. 7, when the base 41 of the at least one electrical terminal 4 has a first dimension 411 and/or a second dimension 412 greater than a first dimension 211 and/or a second dimension 212 of the stack of electrodes respectively, the lateral sides 12 of the electrochemical cell 1 can have a substantially concave form. In other words, in a median zone of the electrochemical cell 1, notably on the first axis X, the liner 3 converges toward the plurality of stacked electrodes 2. Advantageously, the liner can be sufficiently elastic to closely follow both the form of the plurality of stacked electrodes 2 and the form of the base 41 without producing a fold and without being previously deformed.

The result thereof is that the lateral sides 12 of adjacent cells 1 delimit a cooling means 9, more specifically an intercellular space, that allows, by way of example, the circulation of any gas or coolant, notably a dielectric fluid, in order to ensure the cooling of said electrochemical cells 1.

Optionally, such a cooling means 9, or intercellular space, can further receive, for example be at least partly filled with, a material capable of retarding the propagation of flames, for example in the form of a block or of a resin. According to another alternative, such a material can be a compressed foam that makes it possible to apply a pressure onto the cells 1, notably the electrodes 2 of the cell 1.

Such an alternative allows for an advantageous lightening of the storage device 10 by ensuring the cooling of the cells 1 without making use of plates that are conventionally used. It also ensures the durability of the storage device 10, notably of the mechanical components such as the electrical terminals 4 and welds which are usually the most effected by the significant dissipation of heat taking place within the electrochemical cells. Also, such an arrangement offers a benefit in terms of safety, the presence of intracellular spaces reducing the chances of propagation of a thermal incident between adjacent electrochemical cells 1.

The configuration of the electrical terminals 4 contributes, in addition, to simplifying the assembly of the storage device 10, more particularly the connection between the different electrochemical cells 4. Indeed, conventionally, the connection of the different cells 1 requires the cutting and suitable deformation of the different electrical connectors 42, as well as the welding thereof onto a common busbar.

Through the advantageous form of the at least one electrical terminal 4 according to the invention, namely its outer portion 423 that is flat or substantially flat and/or that extends parallel or substantially parallel to the outer face 414 of the base 41, a busbar 91 can directly be positioned in contact with the electrical connectors 42 of the different electrochemical cells 1. The busbar 91 can thus be welded in a single step to the different electrical connectors 42, as illustrated for the two electrochemical cells on the left in FIG. 7. Alternatively, the busbar 91 can be screwed into the electrical connectors 42 when the latter are already tapped, as illustrated for the two electrochemical cells 1 on the right in FIG. 7.

Figure 8:
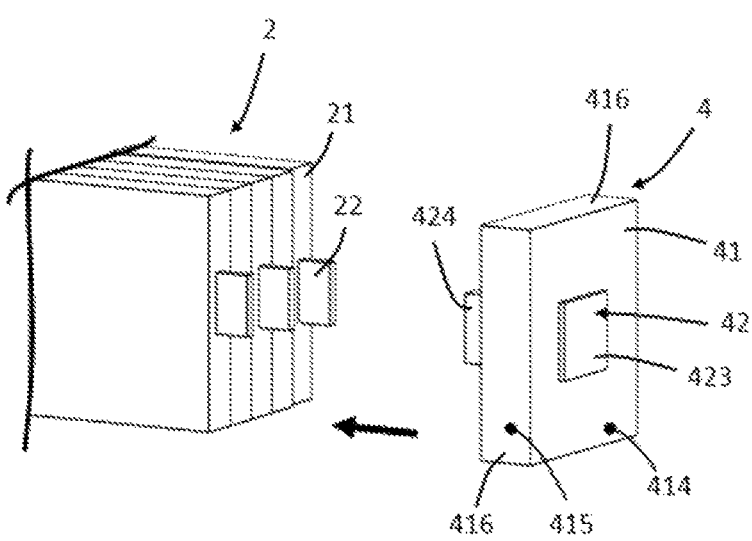
FIG. 8 is a schematic representation of a cross-section of a variant of the electrochemical cell.
Figure 9:
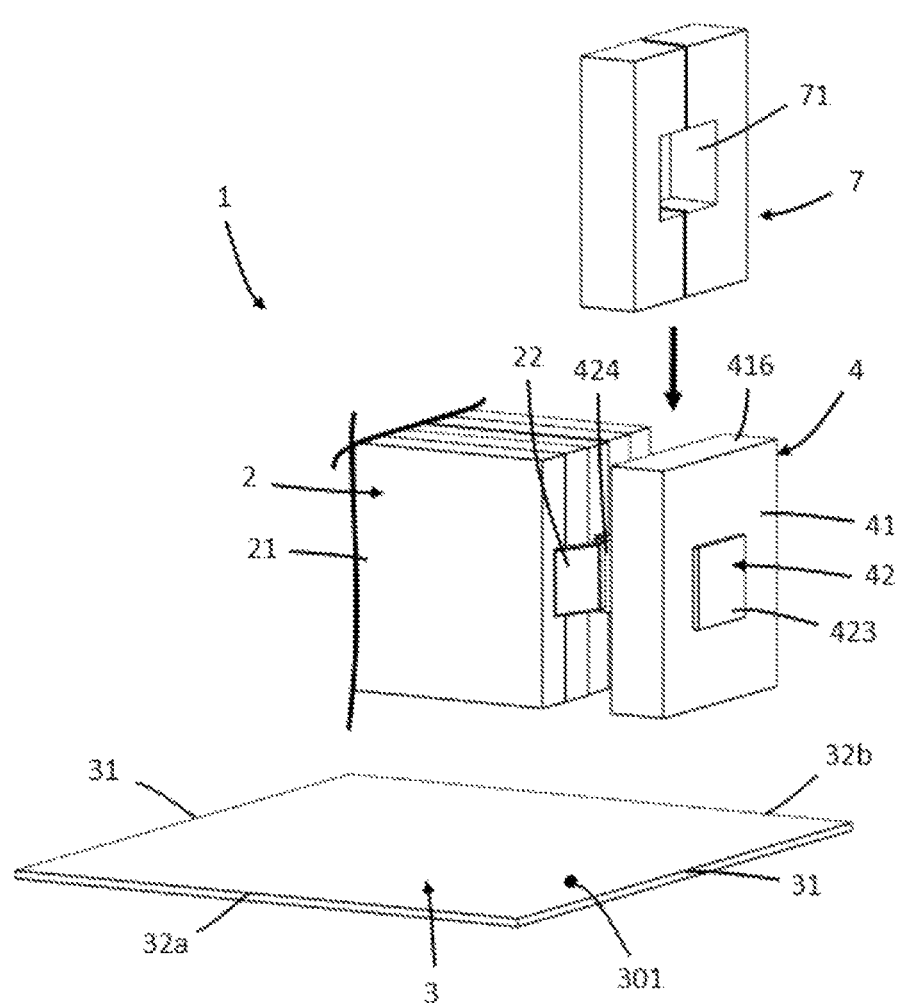
FIG. 9 is a schematic representation of a step of a method for manufacturing the electrochemical cell.
Figure 10:
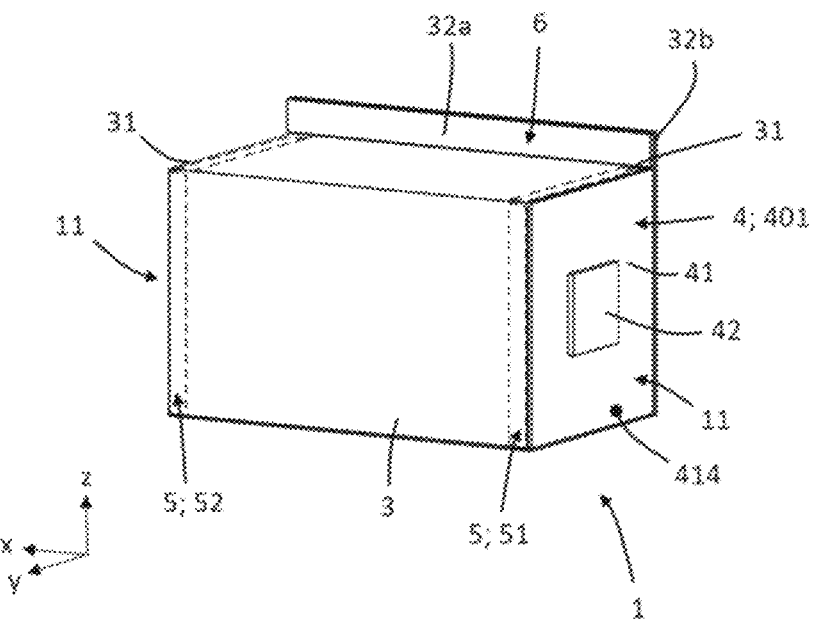
FIG. 10 is a schematic representation of another step of the method for manufacturing the electrochemical cell.
Figure 11:
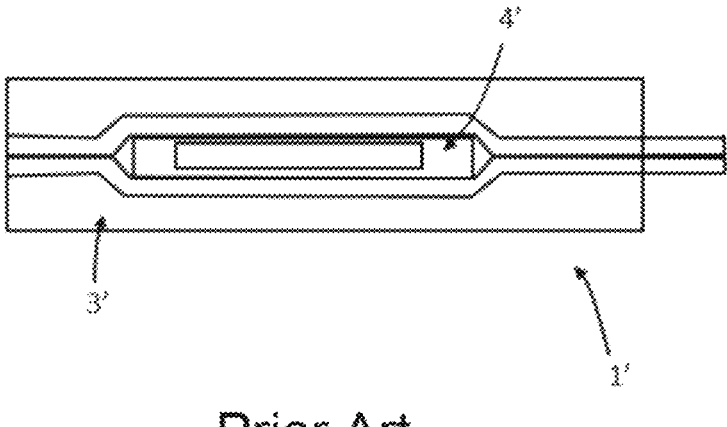
FIG. 11 is a schematic representation of an electrochemical cell of the prior art.

The invention relates finally to a method for manufacturing an electrochemical cell 1 as explained previously. FIGS. 8 to 10 illustrate a mode of execution of the different steps of such a method. It should be noted that, for the purposes of clarity, just one of the end sides 11 is illustrated. The method according to the invention nevertheless extends to the manufacture of an electrochemical cell 1 comprising at least one electrical terminal 4, for example two electrical terminals 401, 402 as previously described with reference to FIG. 2. So, any step or substep described hereinbelow with reference to the at least one electrical terminal 4 will be able to be reproduced for a second electrical terminal 402 or for a plurality of additional electrical terminals.

The method comprises a step of stacking a plurality of electrodes 2. Preferably, as explained previously, the plurality of electrodes 2 is stacked so as to present an alteration of an anode and of a cathode. Furthermore, adjacent electrodes 2 can be separated by an electrically insulating separation element, not represented, interposed between each of the adjacent anodes and cathodes of the plurality of electrodes 2.

Next, a connection step, aiming to link the at least one terminal to the plurality of electrodes 2, is performed. In particular, such a connection is made between a plurality of tongues 22, specific to at least one subset of electrodes 2, for example the cathodes, and the inner portion 424 of the electrical connector 42 of the at least one electrical terminal 4.

The step of connection of said tongues 22 with the at least one electrical terminal 4 can comprise a substep of positioning the plurality of electrodes 2 in such a way that it extends orthogonally, or substantially orthogonally, to the at least one terminal. Furthermore, the plurality of electrodes 2 is disposed in such a way that the tongues 22, specific to at least one subset of electrodes 2, extend toward the at least one electrical terminal 4. In other words, all or part of the tongues 22 extends parallel, or substantially parallel, to the inner portion 424 of the electrical connector 42.

Also, the connection step can comprise a substep of folding or of deformation of one or more tongues 22 of the plurality of electrodes 2 and a substep of welding of said tongues 22 to the electrical connector 42.

The electrochemical cell 1 is then shaped by a step of jacketing the set of the plurality of electrodes 2 and at least a part of the base 41 of the at least one terminal in the non-predeformed liner 3.

The jacketing step can comprise a substep of positioning the assembly formed by the plurality of electrodes 2 and the at least one electrical terminal 4, that are connected to one another, on the inner face 301 of the flat liner 3.

The jacketing step next comprises a substep of alignment of at least one of the end portions 31 of the liner 3 with one of the lateral edges 416 of the perimeter 415 of the base 41 of the at least one electrical terminal 4. In particular, such a positioning of the at least one electrical terminal 4 contributes to strengthening the structure of the electrochemical cell 1.

Furthermore, when the electrochemical cell 1 comprises the first electrical terminal 401 and the second electrical terminal 402, each of said electrical terminals 4 can be positioned at an opposite end portion 31 of the liner 3, thus contributing to a better control of the form of the cell, notably in the step of jacketing the liner 3.

The jacketing step finally comprises a substep of folding the liner 3 into at least one ridge and/or rounded form. Notably, such a ridge and/or rounded form is respectively derived from a corner or from a rounded form of the base 41 of the at least one electrical terminal 4. The expression "folding" is understood to mean the action of folding back at least a part of the liner 3 so as to surround the plurality of electrodes 2 and, at least partially, the at least one electrical terminal 4.

Advantageously, such a folding step makes it possible to hermetically jacket the plurality of electrodes 2 and the at least one electrical terminal 4 with the liner 3 with a limited number of folds thereof. To jacket a set of electrodes of overall parallelepipedal form, only four folds, notably at 90°, are needed. No fold is formed around the electrical connector 42, the liner 3 and the electrical connector 4 having no contact.

Contrary to a step of predeforming by stamping as conventionally implemented for the assembly of a pouch cell 1, such an action does not lead to the stretching of material likely to result in the weakening, even tearing, of the liner 3. So, the method according to the present invention is not subject to the dimension limits conventionally imposed by the predeformation step.

Because of this, there is no need to incorporate in the electrochemical cell 1 according to the invention layers or reinforcing elements, such as nylon linings of the liner 3, as conventionally used to ensure the mechanical strength of the liner 3 during and following the predeformation step. The structure of the electrochemical cell 1 is thus advantageously simplified thereby.

Furthermore, the absence of a predeformation step by stamping allows the manufacturing method to be simplified and therefore its cost to be reduced. The electrochemical cell 1 is then placed in a vacuum and filled with an electrolyte before it is sealed.

The sealing of the electrochemical cell 1 comprises a step of linking the liner 3 to the base 41 of the at least one electrical terminal 4 at at least the primary link 5 and a step of linking the liner 3 to itself at the secondary link 6.

Notably, one and/or the other of the linking steps is performed by thermowelding or bonding.

Optionally, the manufacturing method can comprise an additional step of positioning at least one spacing member 7, implemented following the connection step, interposed between the plurality of electrodes 2 on the one hand and the at least one electrical terminal 4 on the other hand. The spacing member 7 is then disposed in such a way that at least one tongue 22 and/or the electrical connector 42 extends partially through the void 71 of the spacing member 7.

The spacing member 7 thus contributes, with the at least one electrical terminal 4, to ensuring the mechanical strength of the electrochemical cell 1, for example during the sealing, notably in a vacuum, of the cell. It thus prevents the weakening of the liner 3 at the connection interface between the plurality of electrodes 2 and the at least one electrical terminal 4.

Also, optionally, the manufacturing method can comprise a step of surface treatment of the perimeter 415 of the base 41 of the at least one electrical terminal 4 performed before the jacketing step, for example prior to the connection step. Such a treatment aims to ensure a primary link 5, for example by thermowelding, that is durable and defect-free, and compatible with the assembly process.

The present invention thus proposes an electrochemical pouch cell for an electrical energy storage device, notably intended for a motor vehicle, that advantageously makes it possible to overcome the dimensioning limitations that are conventionally associated with electrical pouch cells because of the implementation of a step of predeformation by stamping of the liner.

The electrochemical cell thus allows a greater flexibility of dimensioning while preserving the seal-tightness of the cell, particularly at the at least one electrical terminal. The electrochemical cell according to the invention, on the one hand, makes it possible to reduce the number of electrodes accommodated in the cell, and therefore the power thereof, and, on the other hand, favors the cooling of the cell by increasing the useful cooling surface, thus rendering it better suited to new charging modes.

The present invention should not however be limited to the means and configurations described and illustrated here, and it extends also to any equivalent means or configurations and to any technically operative combination of such means. In particular, the form and the dimensions of the electrical terminals or the number of electrodes can be modified without compromising the invention in as much as they ultimately fulfil the functionalities described and illustrated in the present document.

The invention claimed is:

1. An electrochemical pouch cell for an electrical energy storage device, the electrochemical cell comprising:
   a stack of a plurality of electrodes;
   a liner;

at least one electrical terminal comprising a base produced in an insulating material and an electrical connector extending along a first axis, the base of the electrical terminal having a first dimension on a second axis substantially equal to or greater than a first dimension on the second axis of the stack of the plurality of electrodes, said second axis being orthogonal to said first axis, the at least one electrical terminal and the liner contributing to delimiting a housing in which the plurality of electrodes extends;
   at least one primary link of an end portion of the liner to a perimeter of the base of the at least one electrical terminal;
   a secondary link of an end lateral portion of the liner to an opposite end lateral portion of the liner, that is distinct from the end portion and at least one spacing member disposed in the housing, and interposed between the plurality of electrodes and the at least one electrical terminal, the spacing member comprising at least one void configured to receive at least one tongue of at least one electrode, wherein the spacing member has a cellular structure, the cellular structure comprising cells, in a vacuum, configured to accommodate a gas produced during the operation of the electrochemical cell.

2. The electrochemical cell as claimed in claim 1, wherein the electrical energy storage device is an electrical battery.

3. The electrochemical cell as claimed in claim 1, wherein the plurality of electrodes includes at least one anode and one cathode.

4. The electrochemical cell as claimed in claim 1, wherein the base of the at least one electrical terminal has a second dimension on a third axis substantially equal to or greater than a second dimension on the third axis of the stack of the plurality of electrodes, said third axis being orthogonal to the first axis and to the second axis.

5. The electrochemical cell as claimed in claim 1, wherein the at least one primary link is produced by thermowelding or by bonding and/or wherein the secondary link is produced by thermowelding or by bonding.

6. The electrochemical cell as claimed in claim 1, wherein the electrical connector of the at least one terminal extends through the base, the electrical connector comprising an outer portion that is flat or substantially flat and/or extending parallel or substantially parallel to an outer face of the base.

7. The electrochemical cell as claimed in claim 1, wherein the cellular structure is a honeycomb structure.

8. The electrochemical cell as claimed in claim 1, wherein the base of the at least one electrical terminal comprises:
   a fixing member configured to ensure an anchoring of the electrochemical cell onto a support element;
   a sensor; or
   an overcharge safety device.

9. The electrochemical cell as claimed in claim 8, wherein the sensor is a temperature or pressure sensor.

10. The electrochemical cell as claimed in claim 1, wherein the base of the at least one electrical terminal comprises:
   a fixing member configured to ensure an anchoring of the electrochemical cell onto a support element;
   a sensor; and
   an overcharge safety device.

11. An electrical energy storage device, comprising:
   at least one of the electrochemical cell as claimed in claim 1.

12. The storage device as claimed claim 11, wherein the storage device is for a motor vehicle.

13. The storage device as claimed claim 11, further comprising a cooling means arranged along a lateral side of the at least one electrochemical cell.

14. A hybrid or electric motor vehicle comprising:

at least one of the electrochemical cell as claimed in claim 1.

15. A method for manufacturing the electrochemical cell as claimed in claim 1, comprising:

stacking a plurality of electrodes;

connecting at least one electrical terminal to the plurality of electrodes; positioning at least one spacing member between the plurality of electrodes and the at least one electrical terminal, the spacing member comprising at least one void configured to receive at least one tongue of at least one electrode, wherein the spacing member has a cellular structure, the cellular structure comprising cells, in a vacuum, configured to accommodate a gas produced during the operation of the electrochemical cell;

jacketing a set of the plurality of electrodes and at least a part of the base of the at least one electrical terminal in a non-predeformed liner;

linking the liner to the base of the at least one electrical terminal at a primary link; and linking the liner to itself at a secondary link.

16. The manufacturing method as claimed in claim 15, wherein the jacketing comprises aligning at least one of the end portions of the liner with the perimeter of the base of the at least one electrical terminal.

\* \* \* \* \*